United States Patent [19]

Guzik et al.

[11] Patent Number: 5,137,639
[45] Date of Patent: Aug. 11, 1992

[54] METHOD FOR PURIFYING WASTE WATER USING SURFACE MODIFIED SILICA

[75] Inventors: Frederick F. Guzik, Export; Suresh B. Damle, Pittsburgh, both of Pa.; William W. Carlin, Corpus Christi, Tex.

[73] Assignee: PPG Industries, Inc., Pittsburgh, Pa.

[21] Appl. No.: 697,547

[22] Filed: May 9, 1991

[51] Int. Cl.$^5$ .............................. C02F 1/28; C02F 1/42
[52] U.S. Cl. ........................... 210/679; 210/690; 210/691; 210/928
[58] Field of Search ............ 210/679, 691, 928, 690

[56] References Cited

U.S. PATENT DOCUMENTS

| | | | |
|---|---|---|---|
| 4,058,458 | 11/1977 | Svarz | 210/52 |
| 4,444,665 | 4/1984 | Hildebrandt | 210/660 |
| 4,470,912 | 9/1984 | Beall | 210/691 |
| 4,743,306 | 5/1988 | Jepson et al. | 106/468 |
| 4,804,416 | 2/1989 | Jepson et al. | 106/468 |
| 4,851,128 | 7/1989 | Rose | 210/670 |
| 4,908,137 | 3/1990 | Chen et al. | 210/679 |

OTHER PUBLICATIONS

Roberts, et al., "Removal of Color from Kraft Pulp Mill Effluent", Proc. Ind. Waste conf., 40th, pp. 305-316 (1985).

*Primary Examiner*—Stanley S. Silverman
*Assistant Examiner*—Cynthia L. Nessler
*Attorney, Agent, or Firm*—George D. Morris; Irwin M. Stein; Edward J. Whitfield

[57] ABSTRACT

Disclosed is a process for preparing surface modified silica sorption agent suitable for purifying contaminated aqueous liquid, the sorption agent comprising amorphous, precipitated, silica having surface deposited thereon an organic quaternary ammonium compound.

9 Claims, No Drawings

METHOD FOR PURIFYING WASTE WATER USING SURFACE MODIFIED SILICA

BACKGROUND OF THE INVENTION

Large quantities of waste water are generated in many industrial processes which waste water must be treated to remove various contaminants prior to discharge or recycle. For example, in the paper making industry about 15,000 to 20,000 gallons of process water are required to produce one ton of paper. About 70% of the waste water generated in the paper making process is so-called "white water" which contains a variety of contaminants such as finely divided suspended solids, e.g., cellulose fibers and clays as well as retention aid residues such as long chain fatty acids, organic polymers and the like. White water typically has a milky, opaque appearance, although it could contain various other color bodies depending on the presence or absence of dyestuffs in the various paper coating compositions.

Prior to disposal, or as is more typical, recycle and reuse, the white water must be first purified to remove all or a substantial portion of the various contaminants contained therein. Environmental considerations require removal of contaminants prior to discharge to a receiving stream whereas processing considerations require removal of contaminants prior to recycle and reuse to prevent build-up of contaminant concentrations which adversely effect the finished paper product.

Various sorption agents such as activated carbon and surface modified clay minerals have been used to remove such contaminants from aqueous systems. In accordance with this invention, it has been discovered that amorphous, precipitated silica which has had its surface modified with an organic quaternary amine is suitable for removing contaminants such as finely divided suspended matter, color bodies and dissolved organic residues from aqueous liquids such as the white water generated in a paper making process. This invention also provides a method of making said surface modified amorphous, precipitated silica.

DESCRIPTION OF THE INVENTION

This invention provides a method for making a sorption agent comprising surface modified, amorphous, precipitated silica useful for removing organic and inorganic contaminants from aqueous liquids, particularly white water generated in a paper making process. More particularly, this invention provides a method for making amorphous, precipitated silica having adsorbed thereon at least one organic quaternary ammonium compound, said method dispensing with the need for using any organic solvent. By contacting water that contains organic or inorganic contaminants with the sorption agent prepared according to this invention, such contaminants may be readily and substantially removed. The sorption agent prepared by the method of the invention is particularly suitable for removing contaminants of the type typically contained in white water generated in paper making processes. Such contaminants include, e.g., finely divided pulp and filler particles, color bodies and organic retention aid residues, such as, long chain fatty acids, polymeric species or the like.

Amorphous, particulate, precipitated silica suitable for use in accordance with the invention preferably has a silica content (anhydrous) of at least about 95 percent, a weight mean agglomerate particle size of from about 2.0 to about 20 microns, a BET surface area of from about 30 to about 300 square meters per gram and an oil absorption of from about 100 to about 200 grams per 100 grams of silica. Such materials, as well as their mode of preparation, are well known to the art. Amorphous, precipitated silicas are typically prepared by reacting alkali metal silicate with mineral acid as described, e.g., in U.S. Pat. No. 4,992,251. Amorphous, precipitated silica, suitable for use in the invention, is commercially available from several manufacturers, e.g., PPG Industries, Inc., under its trademarks: Lo-Vel, Hi-Sil, Silene and San-Sil.

Organic quaternary ammonium compounds suitable for use in the invention are likewise well-known to the art and commercially available from a number of sources. Generally speaking, quaternary ammonium compounds suitable for use in the invention are water soluble in the temperature range of from about 50° to about 100° C. and have at least one long chain, saturated or unsaturated, branched or cyclic aliphatic group, preferably containing at least 8 carbon atoms. More particularly, quaternary ammonium compounds suitable for use in the invention may be represented by the formula:

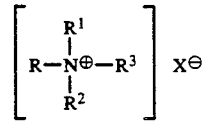

wherein R is a linear, branched or cyclic alkyl containing from 8 to 24 carbon atoms or another organic quaternary ammonium group; $R^1$ is a linear, branched or cyclic alkyl containing from 1 to 24 carbon atoms; $R^2$ is a linear, branched or cyclic alkyl containing from 1 to 8 carbon atoms; $R^3$ is a linear, branched or cyclic alkyl radical containing from 1 to 8 carbon atoms or an aryl or aralkyl group selected from phenyl, benzyl, or tolyl; and X is an anionic species selected from halogen, nitrate, hydroxyl or alkyl sulfate or sulfonate. Preferred quaternary ammonium compounds of the above formula are those wherein R is $C_{16}$ to $C_{21}$ alkyl; $R^1$ and $R^2$ are independently $C_1$ to $C_4$ alkyl, $R^3$ is benzyl and X is halogen, e.g., chlorine or bromine.

Some examples of commercially available quaternary ammonium compounds suitable for use in the invention include dimethyl dicoco ammonium chloride, dimethyl distearyl ammonium chloride, trimethyl soya ammonium chloride, trimethyl cetyl ammonium chloride, trimethyl coco ammonium chloride, dimethyl tallow benzyl ammonium chloride, dimethyl stearyl benzyl ammonium chloride, trimethyl tallow ammonium chloride, trimethyl benzyl ammonium chloride, trimethyl hexadecyl ammonium chloride, trimethyl cetyl ammonium bromide, dimethyl dihydrogenated tallow ammonium chloride, methyl tri(C8-C10) ammonium chloride, hydroxypropyl bis(stearyldimonium chloride) or the like.

Surface modified amorphous precipitated silica is prepared in accordance with the invention by mixing an aqueous solution of quaternary ammonium compound with an aqueous slurry of amorphous precipitated silica for a time sufficient to deposit an effective amount of quaternary ammonium compound on the silica particles. The treated silica may be recovered from the aqueous slurry by any suitable means, e.g., evaporation, spray drying, filtration or the like. The concentration of quaternary ammonium compound in the aqueous solution is not particularly critical and may vary over a wide range depending on the water solubility of the quaternary ammonium compound used. The concentration of quaternary ammonium compound in the aqueous solution could, e.g., range from about 1 to about 50 wt-%, but is more typically in the range of from about 10 to about 25 wt-%. To effect complete dissolution of the quaternary ammonium compound, the solution is heated, typically to a temperature of from about 50° to about 100° C., the heated solution being added to the stirred silica slurry. The amount of amorphous precipitated silica in the aqueous slurry may vary over a wide range, ease of mixing being the principal consideration. Typically the aqueous slurry will contain from about 5 to about 30, preferably from about 10 to about 20 wt-% silica. The relative amounts of quaternary ammonium compound and silica are selected so as to deposit, on the surface of the silica particles, from about 2.0 to about 20, preferably from about 4.0 to 10, wt-% quaternary ammonium compound based on weight of silica. The time required to deposit the requisite amount of quaternary ammonium compound on the silica particles will, of course, vary depending on the relative amounts of quaternary ammonium compound in the aqueous solution and silica in the aqueous slurry, and may range from a few minutes to several hours. Generally speaking contact time will range from about ½ hour up to about 4 or 5 hours at temperature ranging from about ambient up to about 40° C. As beforesaid, the surface modified silica may be separated from the aqueous slurry by any suitable means, spray drying being particularly preferred.

When used to remove contaminants from aqueous liquids, a decontaminating amount of the sorption agent, i.e., the surface modified silica, of the invention may be mixed or slurried with the contaminated liquid for a time sufficient to remove all or a significant amount of contaminants therefrom. The amount of sorption agent of the invention used for a given volume of contaminated liquid and the contact time between the contaminated liquid and the sorption agent of the invention will, of course, vary over a wide range, depending on the kinds and quantities of contaminants. However, one skilled in the art may readily determine, by routine experimentation, optimum amounts and contact times of a particular sorption agent of the invention with a particular contaminated aqueous liquid. As a general guideline, from about 0.1 to about 5.0 wt-% of a sorption agent of the invention based on weight of contaminated water undergoing treatment should provide satisfactory purification at contact times ranging from about 5 minutes up to about 2-3 hours. The sorption agent of the invention having the contaminants adsorbed thereon is then separated from the purified aqueous liquid by any suitable means, e.g., filtration, flotation, centrifugation, or the like. Alternatively contact between the contaminated aqueous liquid and the sorption agent of the invention can be effected by filtering the contaminated aqueous liquid through a layer of the sorption agent of the invention.

The used or spent sorption agent can, of course, be regenerated so that the adsorbed contaminants can be concentrated for disposal and the sorption agent reused. Regeneration may be effected by any means known to the art, e.g., treating the sorption agent with an aqueous alkaline wash equivalent to at least about two volumes of wash per volume of sorption agent followed by washing with water. Regeneration efficiency is typically about 88%.

The invention is further illustrated, but is not intended to be limited by the following Examples.

EXAMPLE 1

This Example is illustrative of the preparation of a preferred sorption agent of the invention.

An aqueous slurry containing about 1.8 pounds of dimethyl stearyl benzyl ammonium chloride in about 1.6 gallons of water was heated to about 70° C. to effect complete dissolution of the quaternary ammonium compound. The hot quaternary ammonium compound solution was slowly added to a vigorously stirred aqueous slurry containing about 28.2 pounds of particulate, amorphous, precipitated silica in about 30 gallons of water. The amorphous precipitated silica (Silene 732D product of PPG Industries, Inc.) had a silica content (anhydrous) of about 97.5%, a weight mean agglomerate particle size of about 9.0 microns, a BET surface area of 35–40 square meters per gram and an oil adsorption of about 150 grams per 100 grams of silica. After mixing for about ½ hour the mixture was passed through a Niro spray dryer over a period of about 4 hours, the dryer having an inlet temperature of about 300° to 330° C. and an outlet temperature of about 100° to 110° C. The dried silica had deposited thereon about 6 wt-% of the quaternary ammonium compound.

EXAMPLE 2

This Example is illustrative of the use of the sorption agent prepared as described in Example 1 to purify contaminated process water of the type actually generated in a paper making process, i.e., white water.

To a 100 milliliter sample of white water was added 1.0 gram of the sorption agent prepared as described in Example 1. The mixture was stirred for about 10 minutes at ambient temperature. The sorption agent was separated by filtration and the surface tension of the treated liquid was measured. Note: It has been found that measurement of surface tension is an expedient means of determining the extent of removal of contaminants from aqueous liquids, such as white water, the increase in surface tension of a treated versus an untreated sample being indicative of the extent of contaminant removal. The surface tension of the sample of white water treated as described hereinabove was 63.2 dynes per centimeter as compared with a surface tension of 50.3 dynes per centimeter for the untreated white water sample. For purpose of comparison, the surface tension of distilled water was 67.1 dynes per square centimeter. All surface tension measurements were made on a Cenco-du Nouy tensiometer under the same conditions of atmospheric pressure and ambient temperature.

In addition, laboratory studies have shown that color bodies present in paper mill process water can be reduced by 85 to 95% by treatment of the effluent with the sorption agent of the invention.

Although the invention has been described by the foregoing with particular reference to a preferred embodiment thereof, it is clear that many variations may be made therein by one skilled in the art simply by varying the choice of starting materials, i.e., the particular amorphous, precipitated silica and the particular quaternary ammonium compound deposited thereon. Also, although the use of the sorption agents of the invention has been described with particular reference to purifying and clarifying aqueous paper mill effluent, namely, white water, the sorption agents of the invention can be used to decontaminate, decolor and otherwise purify a variety of aqueous industrial waste water or sewage and may be used to the same effect with water intended for potable use.

We claim:

1. A method for purifying contaminated aqueous liquids by contacting the contaminated liquid with an effective decontaminating amount of a sorption agent comprising amorphous, precipitated silica having adsorbed thereon from about 2 to about 20 wt-% based on weight of silica of at least one organic quaternary ammonium compound and separating the sorption agent from the purified aqueous liquid.

2. The method of claim 1 wherein the quaternary ammonium compound is water soluble in the temperature range of from about 50° to about 100° C. and has at least one long chain, saturated or unsaturated, branched or cyclic aliphatic group.

3. The method of claim 2 wherein the quaternary ammonium compound is represented by the formula:

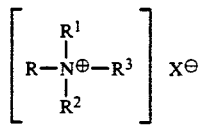

wherein R is a linear, branched or cyclic alkyl containing from 8 to 24 carbon atoms or another organic quaternary ammonium group; $R^1$ is a linear, branched or cyclic alkyl containing from 1 to 24 carbon atoms; $R^2$ is a linear, branched or cyclic alkyl containing from 1 to 8 carbon atoms; $R^3$ is a linear, branched or cyclic alkyl containing from 1 to 8 carbon atoms or an aryl or aralkyl group selected from phenyl, benzyl or tolyl; and X is an ionic species selected from halogen, nitrate, phosphate, hydroxyl or alkyl sulfate or sulfonate.

4. The method of claim 3 wherein R is $C_{16}$ to $C_{21}$ alkyl; $R^1$ and $R^2$ are independently $C_1$ to $C_4$ alkyl; $R^3$ is benzyl; and X is halogen selected from chlorine or bromine.

5. The method of claim 4 wherein the quaternary ammonium compound is dimethyl stearyl benzyl ammonium chloride.

6. The method of claim 1 wherein the amorphous precipitated silica has a silica content (anhydrous) of at least about 95%, a weight mean particle size of from about 2.0 to about 20 microns, a BET surface area of from about 30 to about 300 square meters per gram and an oil adsorption of from about 100 to about 200 grams per 100 grams.

7. The method of claim 1 wherein the silica has from about 2 to about 20 wt-% of quaternary ammonium compound deposited thereon.

8. The method of claim 7 wherein the silica has from about 4 to about 10 wt-% of quaternary ammonium compound deposited thereon.

9. The method of claim 1 wherein the contaminated aqueous liquid is white water of the type generated in a paper making process.

* * * * *